United States Patent
Barwicz et al.

(10) Patent No.: US 9,568,682 B1
(45) Date of Patent: Feb. 14, 2017

(54) COMPONENT AND CHIP ASSEMBLY STRUCTURE FOR HIGH YIELD PARALLELIZED FIBER ASSEMBLY

(71) Applicant: International Business Machines Corporation, Armonk, NY (US)

(72) Inventors: Tymon Barwicz, Yorktown Heights, NY (US); Nicolas Boyer, Quebec (CA); Paul F. Fortier, Quebec (CA); Alexander Janta-Polczynski, Quebec (CA); Stephan L. Martel, Quebec (CA); Jean-Francois Morissette, Quebec (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/018,734

(22) Filed: Feb. 8, 2016

(51) Int. Cl.
    *G02B 6/36* (2006.01)

(52) U.S. Cl.
    CPC ............. *G02B 6/3652* (2013.01); *G02B 6/362* (2013.01); *G02B 6/3608* (2013.01); *G02B 6/3636* (2013.01)

(58) Field of Classification Search
    CPC ...... G02B 6/3636; G02B 6/362; G02B 6/3652
    See application file for complete search history.

(56) References Cited

U.S. PATENT DOCUMENTS

| | | |
|---|---|---|
| 6,690,864 B1 | 2/2004 | Dee et al. |
| 6,798,970 B1 * | 9/2004 | Brown ................. G02B 6/3612 269/21 |
| 2002/0009271 A1 * | 1/2002 | Herve ................. G02B 6/2551 385/98 |
| 2014/0270652 A1 | 9/2014 | Barwicz et al. |

FOREIGN PATENT DOCUMENTS

| | | |
|---|---|---|
| JP | 353207 A | 3/1991 |
| JP | 2992545 B2 | 12/1999 |
| JP | 2003121693 A | 4/2003 |
| JP | 2003262760 A | 9/2003 |
| JP | 2015075651 A | 4/2015 |
| JP | 2015169821 A | 9/2015 |
| TW | 291132 B | 11/1996 |
| WO | 03001254 A3 | 1/2003 |

* cited by examiner

*Primary Examiner* — Omar R Rojas
(74) *Attorney, Agent, or Firm* — Cantor Colburn LLP; Vazken Alexanian

(57) ABSTRACT

A component and chip assembly apparatus includes an assembly stage configured to support a chip, the chip including grooves defining a first pitch, the grooves including a first groove opening configured to receive a plurality of optical fibers and to align the plurality of optical fibers. A picker brings a fiber component including a plurality of optical fibers having a second pitch into contact with the chip such that each optical fiber is aligned with a respective groove. At least one of the assembly stage and the picker includes a comb having a plurality of teeth that define individual cavities therebetween, the cavities having a first cavity opening to receive the optical fibers and isolate each optical fiber from one another and pre-align the optical fibers so as to adjust the second pitch to substantially match the first pitch.

20 Claims, 20 Drawing Sheets

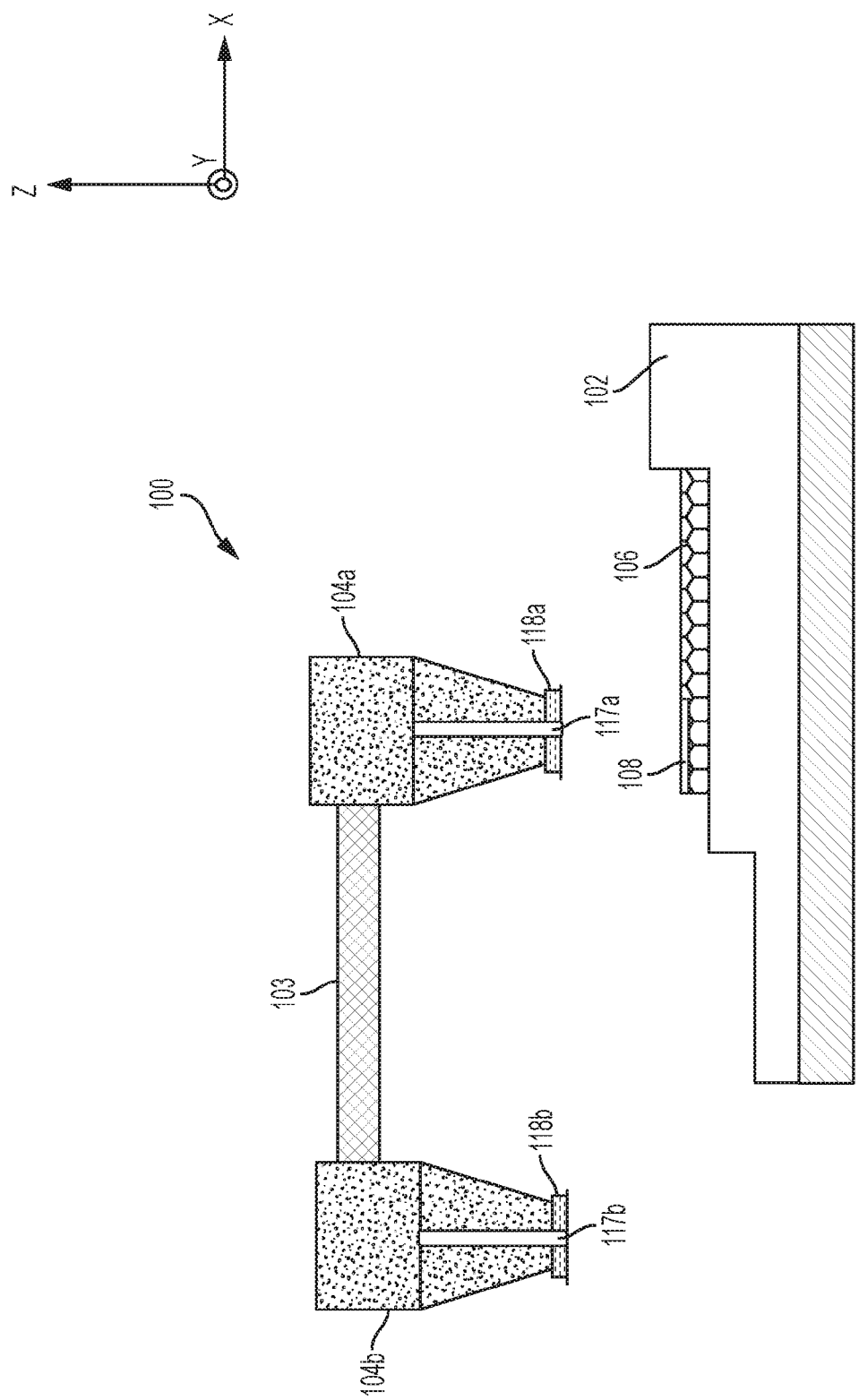

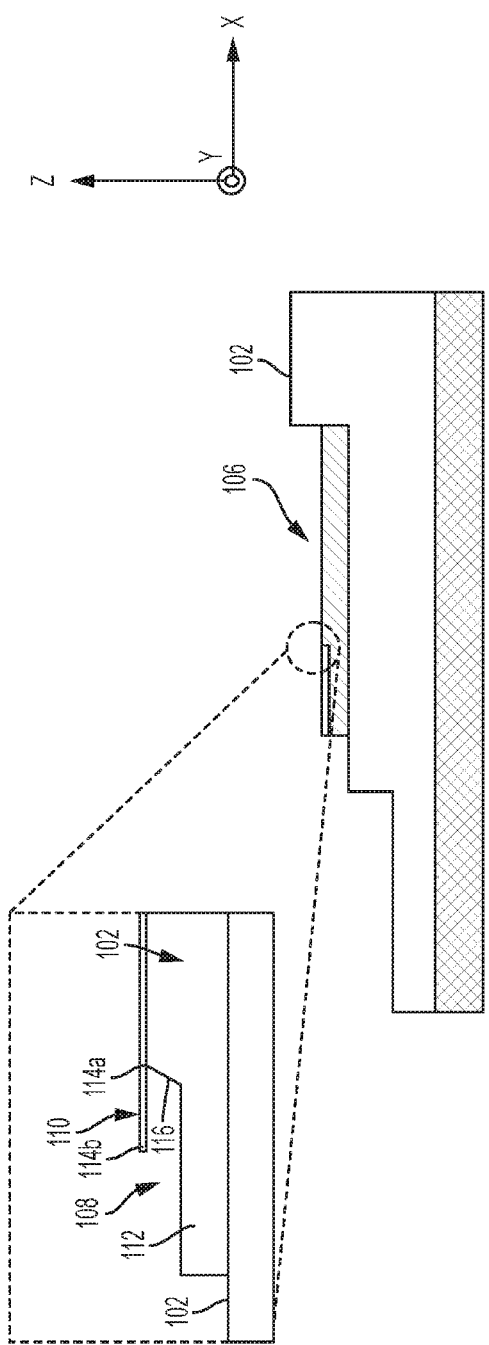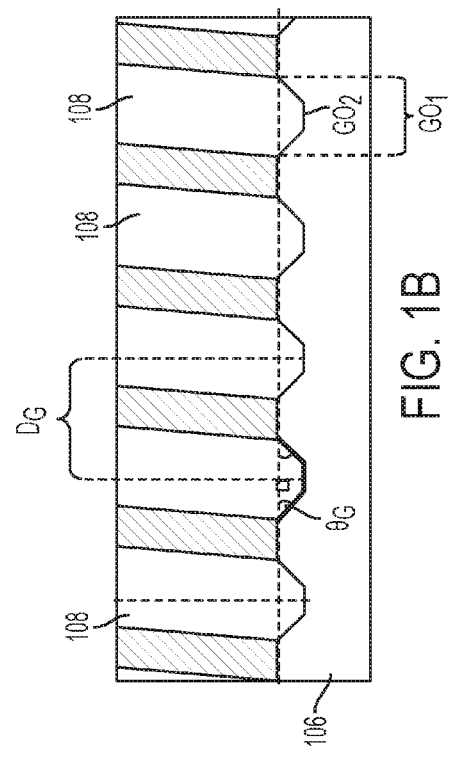

PICK LID

PICK FIBER COMPONENT

PLACE

POSITION OVER CHIP

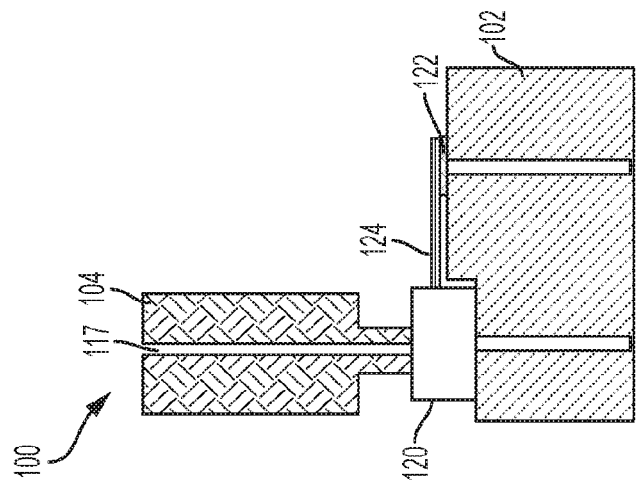
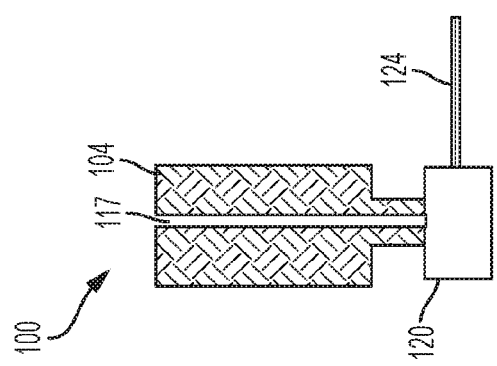
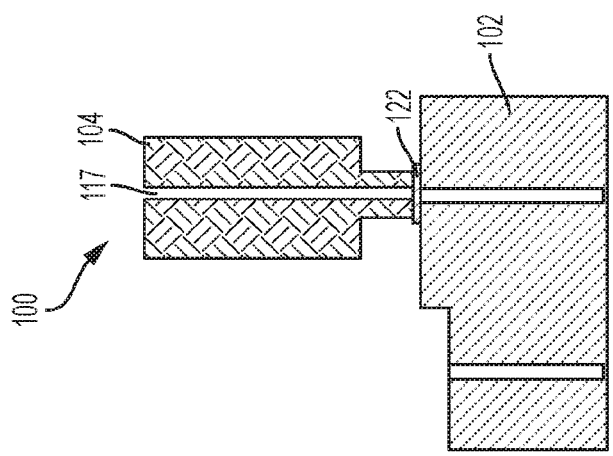
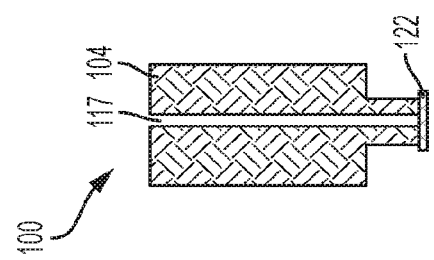

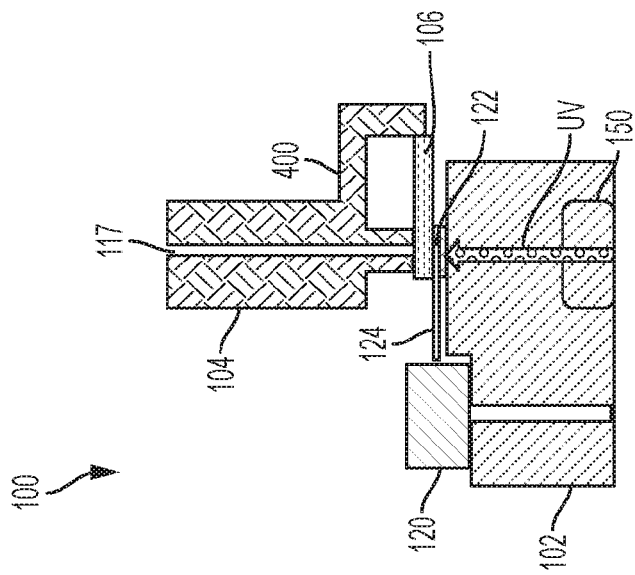
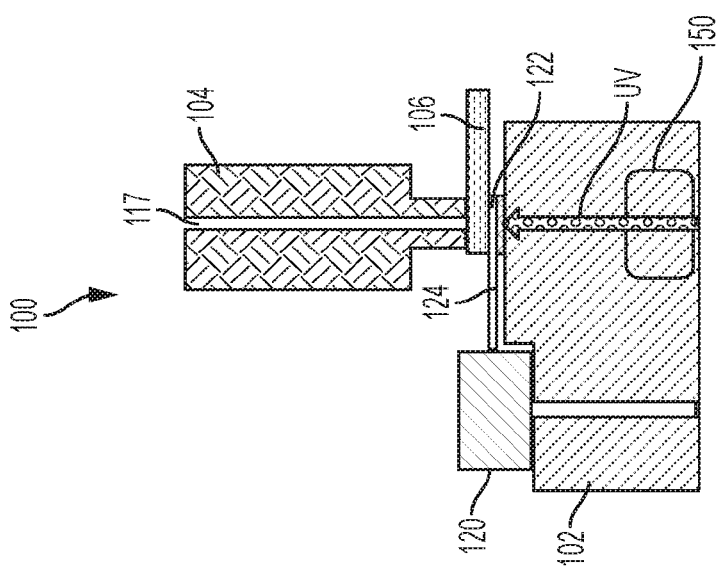
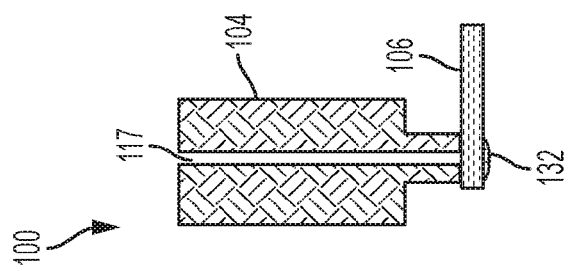

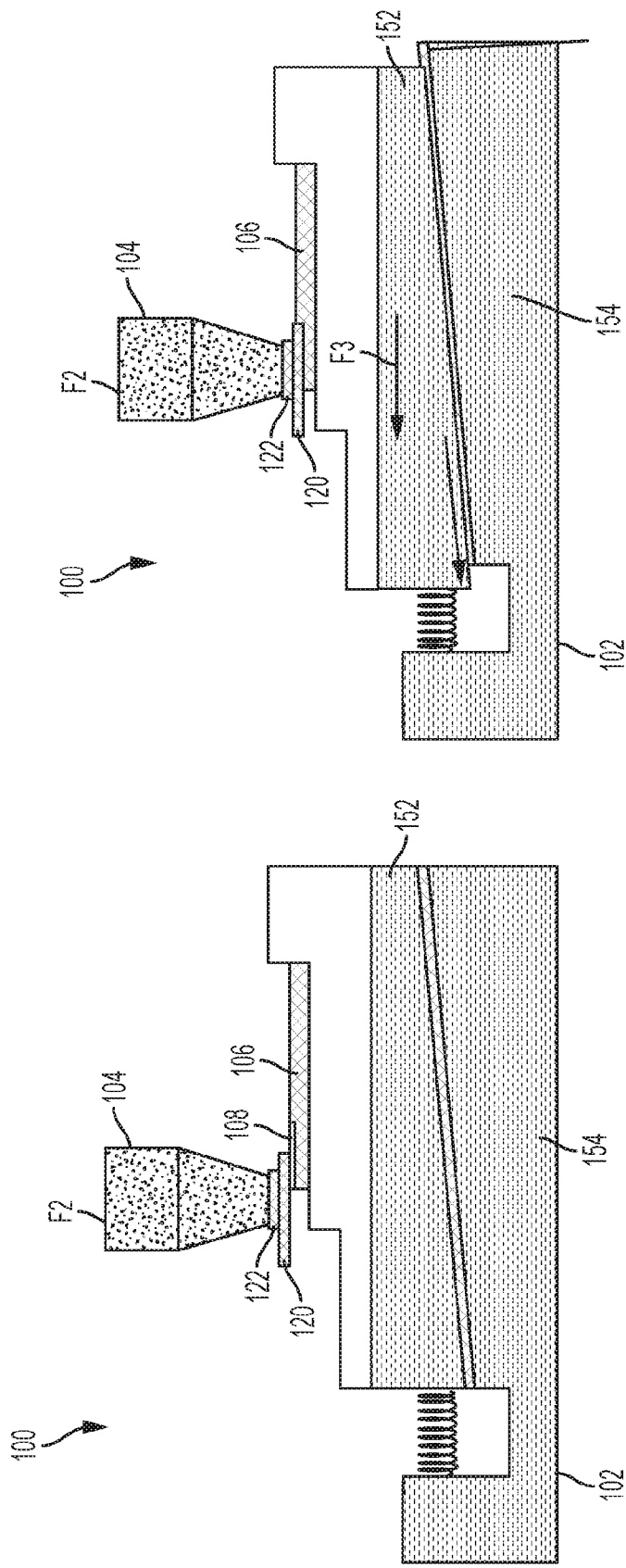

COMPONENT AND CHIP ASSEMBLY STRUCTURE FOR HIGH YIELD PARALLELIZED FIBER ASSEMBLY

BACKGROUND

This invention relates generally to assembly of microelectronic, optoelectronic and photonic components, and more specifically, to a component and chip assembly apparatus configured to optically couple optical fibers to light guides formed in a semiconductor chip.

In various technological fields such as photonics, for example, it may be necessary to attach a component having optical fibers to a waveguide coupler included with a photonic device. A cost effective approach to complete this attachment is to use a standard high throughput component and chip assembly apparatus typically referred to as a pick-and-place tool.

Standard pick-and-place tools include a picker mechanism that works to pick up the fiber component using a motion arm that includes a pick head. The picker brings the optical fibers into contact with a substrate or chip (i.e., the part the component will be placed on) which sits on a stationary assembly stage. The fiber component and the substrate/chip are then aligned in the X and Y-axes (e.g., horizontal axes) and the motion arm moves down in the Z-axis (e.g., vertical axis) to place the fiber component on the substrate/chip. The motion arm, however, typically does not have the capability to make a precise horizontal motion necessary to butt-couple the fibers and the waveguide coupler once the optical fibers come into contact with the chip. Moreover, even if such precise horizontal motion were possible, the motion arm does not generally have pressure controls in the horizontal displacement directions (e.g., the X and Y axes) in order to control the force of the butt-couple.

A conventional solution to provide the necessary horizontal motion is to pre-fix a fiber lid to the optical fibers using, for example, adhesive. That is, the optical fibers are fixed to the lid and are unable to move freely as the fibers are constrained by the adhesive as a function of the adhesive's compliance. Thereafter, the fiber component (having the lid already attached to the optical fibers) is picked up and maneuvered to the assembly stage such that the optical fiber/lid assembly is brought into contact with the chip. The assembly stage to which the chip is placed upon contains an angled sliding plane which converts some of the z-direction placement force to a horizontal force, pending on the angle of the sliding plane. This causes the chip to move towards the fiber component in the x-direction thus allowing the fibers to butt couple to the waveguide couplers on the chip. As the fixated fibers are first pressed into v-grooves on the chip to allow for proper alignment, the fibers apply a force to the v-groove walls thus creating a friction force (i.e. the sliding frictional coefficient) when the chip moves towards the fiber component and the fibers attempt to slide along the v-groove features.

SUMMARY

According to an embodiment of the present invention, a component and chip assembly apparatus comprises an assembly stage configured to support a chip, the chip including grooves defining a first pitch, the grooves including a first groove opening configured to receive a plurality of optical fibers and to align the plurality of optical fibers. The apparatus further includes a picker configured to bring a fiber component including a plurality of optical fibers having a second pitch into contact with the chip such that each optical fiber is aligned with a respective groove. At least one of the assembly stage and the picker includes a comb having a plurality of teeth that define individual cavities therebetween, the cavities having a first cavity opening to receive the optical fibers and isolate each optical fiber from one another and pre-align the optical fibers so as to adjust the second pitch to substantially match the first pitch. The first cavity opening is larger than the first groove opening, and a cavity width defined by the cavity at any vertical distance from the first comb opening is larger than a width of the chip groove at any vertical distance from the first groove opening.

According to an embodiment of the present invention, a method of disposing optical fibers of a fiber component into respective groves formed in a chip comprises applying a first force via a first picker head to a first surface of an optical fiber lid so as to support the optical fiber lid to the first picker head prior to supporting the fiber component. The method further comprises applying a second force via a second picker head to the fiber component after supporting the optical lid, the second force supporting the fiber component to the second picker head such that the optical fiber are loosely disposed against a second surface of the optical fiber lid opposite the first surface. The method further comprises moving the first and second picker along a vertical direction to bring the fiber component into contact with the chip such that the optical fibers freely move in response to contacting the grooves so as to align each optical fiber with a respective groove.

According to yet another embodiment of the present invention, a method of disposing optical fibers of a fiber component into respective groves formed in a chip comprises performing a first component transferring process that transfers an optical fiber lid from a picker head installed on an electronic chip assembly apparatus to an assembling stage. After performing the first component transferring process, the method further performs a second transferring process that transfers a fiber component from the picker head to the assembling stage such that a plurality of optical fibers included with the fiber component are loosely disposed against an exposed surface of the lid. After performing the second component transferring process, the method further performs a third transferring process that transfers a chip from the picker head to the assembling stage such that groves formed in the chip are aligned with the optical fibers and receive the optical fibers therein.

Additional features are realized through the techniques of the present invention. Other embodiments are described in detail herein and are considered a part of the claimed invention. For a better understanding of the invention with the features, refer to the description and to the drawings.

BRIEF DESCRIPTION OF THE DRAWINGS

FIGS. 1A-1C illustrate a component and chip assembly apparatus configured to loosely dispose optical fibers against a fiber lid according to a non-limiting embodiment;

FIGS. 12A-12I illustrate a component and chip assembly apparatus including a sequenced single picker configured to loosely dispose optical fibers on a surface of a fiber lid prior to disposing the optical fibers in the chip grooves according to various non-limiting embodiments;

DETAILED DESCRIPTION

Figure 2A:
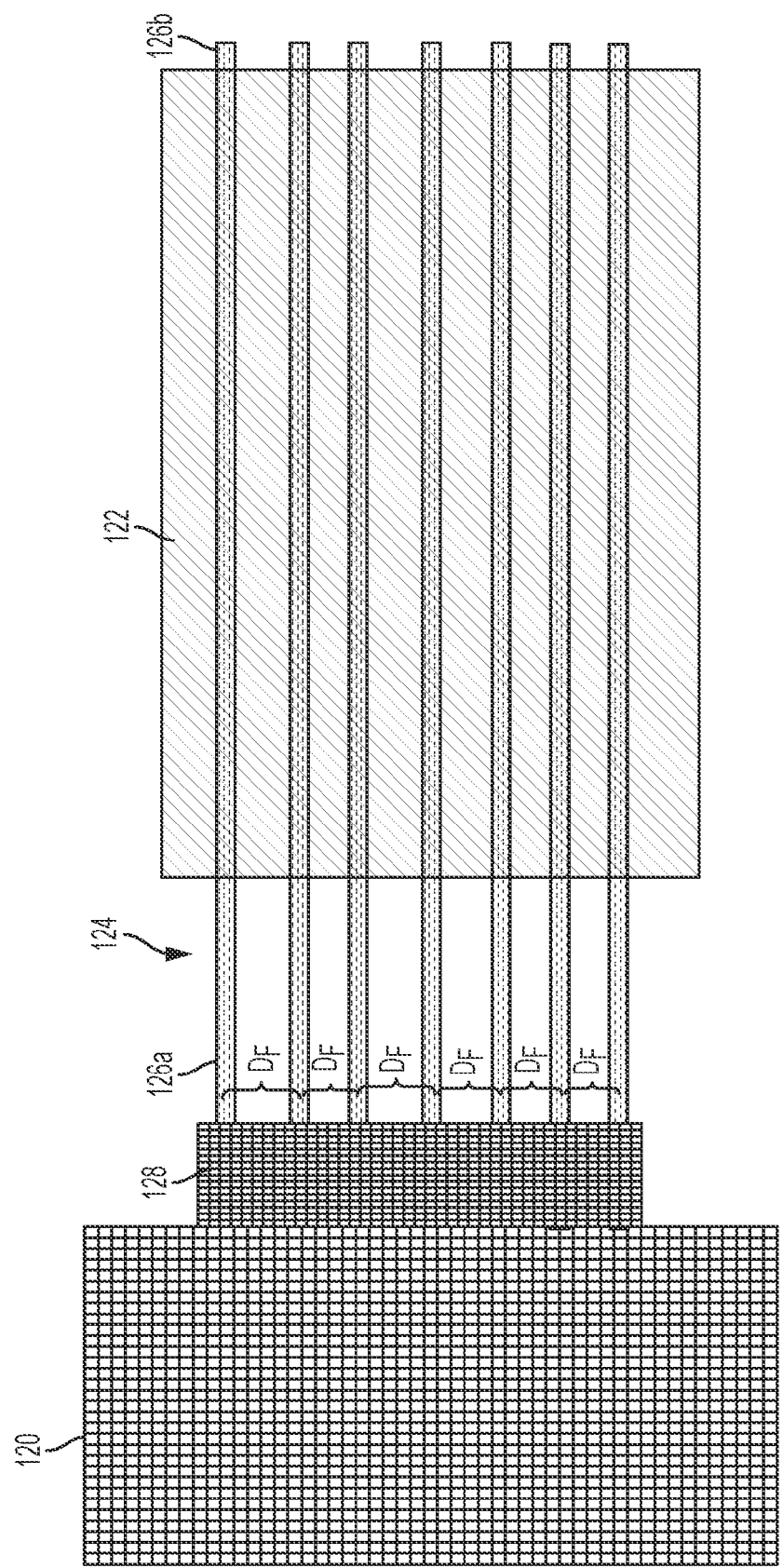
FIGS. 2A-2E illustrate a component and chip assembly apparatus including a dual-picker mechanism configured to pick and place components using a vacuum force according to a non-limiting embodiment.
Figure 2B:
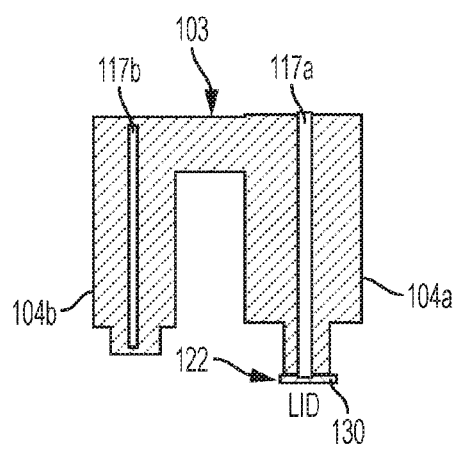
Figure 2C:
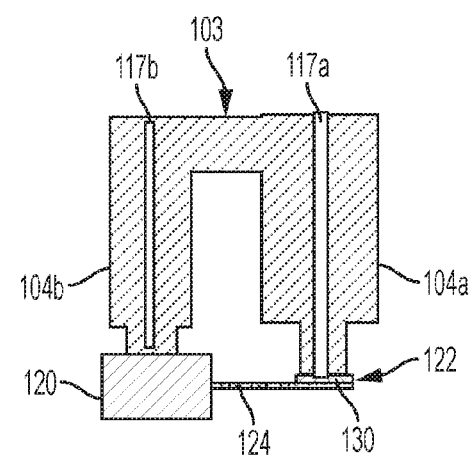
Figure 2E:
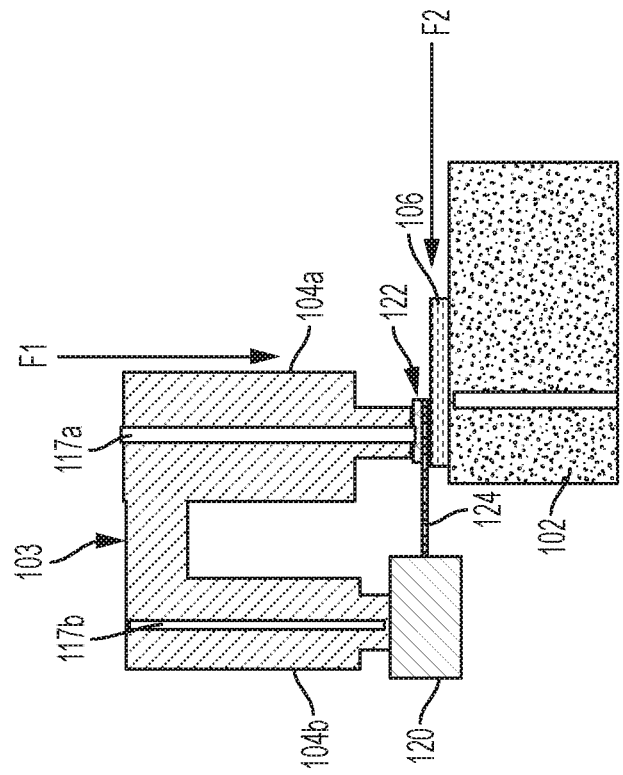
Figure 2D:
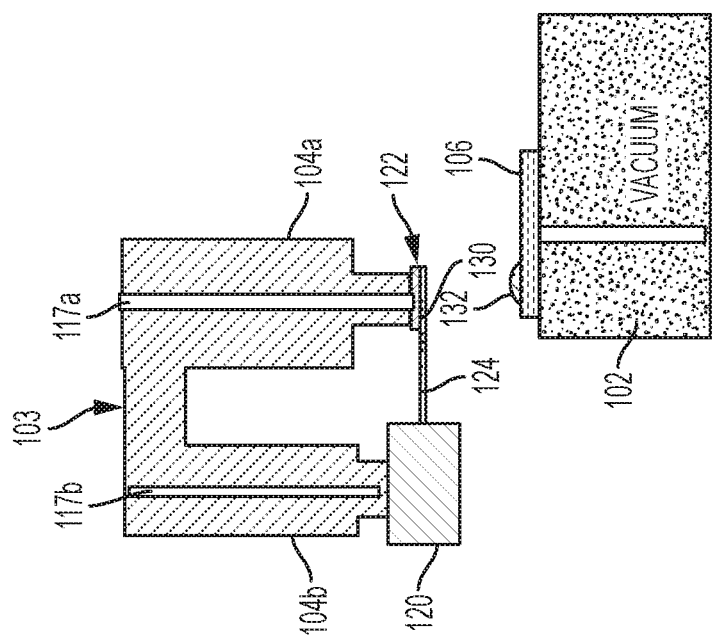

Various embodiments of the disclosure provide a component and chip assembly apparatus that improves the process of optically coupling optical fibers to light guides formed in a semiconductor chip by assembling an optical lid simultaneously, or approximately at the same time, the optical fibers are placed onto the chip. In this manner, the loose ends (e.g., fiber tips) of the optical fibers are free to move into the V-grooves formed in the chip, and are forced into alignment. The ability to allow the loose ends to freely move with respect to the lid reduces the friction force when the fibers are slid down the V-groove during a butt coupling process performed to optically couple the fibers with the light guides. In addition, the cost of pre-applying the lid to the fiber component is removed.

In addition, at least one embodiment includes a comb configured to pre-align the optical fibers with respect to the V-grooves of the chip. The pre-alignment will bring all the fibers to within the required pitch tolerance, so they will be properly guided by the V-groove, and this value is approximately ±40 micrometers (μm).

With reference now to FIGS. 1A-1C, a component and chip assembly apparatus 100 is illustrated according to a non-limiting embodiment. The apparatus 100 includes an assembly stage 102 and one or more pick-and-place mechanisms 104a-104b (hereinafter referred to as a picker). As further illustrated in FIG. 1A, at least one embodiment includes a component and chip assembly apparatus 100 includes a dual-headed picker mechanism 103. The dual-headed picker mechanism 103 includes a first picker 104a and a second picker 104b as discussed in greater detail below.

The assembly stage 102 is configured to support a substrate or semiconductor chip 106. The chip 106 includes one or more grooves 108 and one or more waveguide couplers 110. The grooves 108 extend in a first direction (e.g., the X-axis) along a first surface 112 of the chip 106. In at least one embodiment shown in FIG. 1B, the grooves are V-shaped grooves and are spaced apart from one another to define a first pitch, i.e., a groove pitch. The V-shaped grooves are defined by extending into the chip 106 at a groove angle ($\theta_G$) so as to define a first groove opening ($G_{O1}$) which gradually decreases to a second groove opening ($G_{O2}$). According to a non-limiting embodiment the first pitch ranges, for example, the pitch can be 250 μm for fibers with a diameter of 125 μm, however the pitch can be larger or smaller pending on the application and fiber diameter. The lower end of the range will be limited by the fiber diameter and the ability to create separate V-grooves for each fiber.

The waveguide couplers 110 include a first end 114a that is coupled to the chip 106 and a second end 114b that extends along the first direction (e.g. X-axis) from the chip 106 and into a respective groove 108 (see FIG. 1C). Accordingly, the waveguide couplers are configured for placement adjacent to or in contact with a respective optical fiber as discussed in greater detail below.

The dual-headed picker mechanism 103 is configured to support a fiber component (not shown in FIGS. 1A-1C) independently from a fiber lid (not shown in FIGS. 1A-1C). That is, a conventional component and chip assembly apparatus consists of only a single picker head configured to support a fiber component having the fiber lid pre-fixed to the optical fibers. Thus, the fiber lid is fixated to the optical fibers prior to the picker head picking up the optical component. However, the dual-headed picker mechanism 103 according to at least one non-limiting embodiment includes a first picker 104a configured to support the fiber lid and a second picker 104b configured to support the fiber component independently from the fiber lid.

Referring again to FIG. 1A, at least one non-limiting embodiment includes a dual-headed picker mechanism 103 configured to use a vacuum force to pick up and support the fiber component and the fiber lid. For instance, the first and second pickers 104a-104b are formed to define vacuum pathways 117a-117b that terminate at each respective picker end face 118a-118b. When the vacuum pathways 117a-117b are activated (i.e., a vacuum force is delivered through the vacuum pathways 117a-117b), the first and second pickers 104a-104b can pick up and hold a respective component (e.g., a fiber component and a fiber lid) as discussed in greater detail below.

In at least one embodiment, first and second pickers 104a-104b may include materials that are fully or partially transparent to ultraviolet (UV) light. These materials may include UV-transparent materials that allow for UV curing of any adhesive provided between components supported by the end faces 118a-118b through a respective picker 104a-104b without requiring that the pickers 104a-104b be retracted from the supported component.

With reference now to FIGS. 2A-2E, operation of a component and chip assembly apparatus 100 including a dual-picker mechanism 103 configured to pick and place components using a vacuum force is illustrated according to a non-limiting embodiment. As mentioned above, the dual-picker mechanism 103 is configured to pick up a fiber component 120 independently from a fiber lid 122.

With further reference to FIG. 2A, the fiber component 120 includes one or more optical fibers 124. Although a total of seven optical fibers 124 are illustrated, the number of optical fibers is not limited thereto. For example, fiber component 120 may include more or less optical fibers 124. Each optical fiber 124 extends along the first direction (e.g., the X-axis) from a first portion 126a to an opposing second end 126b. Although not illustrated, the first portion 126a of the optical fiber 124 may extend into a portion of the fiber component 120 (e.g., a ferrule). The first ends 126a are fixated to a first surface 128 of the fiber component 120, while the second ends 126b are loose and free to move with respect to one another, and also free to move with respect to the lid 122. In at least one embodiment, the optical fibers 124 define a second pitch, i.e., a fiber pitch, ($D_F$). Since the second ends 126b are loose and free to move, the fiber pitch may be different from the first pitch (i.e., groove pitch) defined by the grooves 108.

According to a non-limiting embodiment, the dual-picker mechanism 103 may move in the X, Y and/or Z axes. In this manner, the dual-picker mechanism 103 may first pick up the fiber lid 122 using the second picker 104b (see FIG. 2A), and then subsequently pick up the fiber component 120 using the first picker 104a (see FIG. 2B). As a result, the optical fibers 124 are loosely disposed against an exposed surface 130 of the fiber lid 122 as further illustrated in FIG. 2B. After obtaining the fiber component 120 and the fiber lid 122, the dual-picker mechanism 103 may move to align the second picker 104b with respect to chip 106, and in particular, with respect to the grooves (not shown in FIGS. 2A-2E) formed in the chip 106 (see FIG. 2C). In at least one embodiment, an adhesive layer 132 is deposited on the chip 106 so as to attach the fiber lid 122 and the optical fibers 124 to the chip 106 as discussed in greater detail below.

Once aligned with the grooves, the dual-head picker mechanism 103 moves downward (e.g., in the Z-axis direction), and applies a first pressurizing force F1 in along the Z-axis to force the optical fibers 124 into the grooves of the chip 106. In this manner, each optical fiber 124 is aligned with a respective groove (e.g., V-groove). In addition, the assembly stage 102 is configured to convert a portion of the first pressurizing force F1 into a second pressurizing force F2 without disengaging the fiber component 120 and/or fiber lid 122 or rotating of the assembly stage 102. This second pressurizing force F2 is directed along the X and/or Y-axes and forces the chip 106 towards the loose ends of the optical fibers 124 so as to perform a butt coupling process that couples the loose ends of the optical fibers 124 to a respective second end 114b of the waveguide couplers 110. Moreover, the assembly stage 102 is further configured to reduce the application of the second pressurizing force F2.

The second pressurizing force F2 thus acts on the chip 106 through contact with the assembly stage 102 and is a reactive force that results from the sliding geometry of the assembly stage 102 as described below. The second pressurizing force F2 is generally always present as long as there is a first pressuring force F1 and a non-zero sliding angle. However, the second pressurizing force F2 may not always generate a displacement of the chip 106. As described below, a counterforce may be used on the assembly stage 102 so the second pressurizing force F2 must be larger than the counterforce to generate a displacement. It will be understood that the ability of the assembly stage 102 to stop the application of the second pressurizing force F2 may be independent of the point at which the respective loose ends of the optical fibers 124 come into contact with the second end 114b of the waveguide couplers 110.

In at least one embodiment, the assembly stage 102 may include a fixed base structure, while the picker 104a/104b moves laterally (e.g., along the X-axis) with respect to the fixed base structure. Accordingly, the picker 104a/104b generates the force F2.

As mentioned above, the optical fibers 124 and the fiber lid 122 may be attached to the chip 102 using an adhesive layer 132. The adhesive layer 132 may be UV-sensitive adhesive that is deposited on upper surface of the chip 106 prior to applying of the first and second pressurizing forces F1 and F2. Once one or more optical fibers 124 are butt coupled to a second end 114b of a respective waveguide coupler 110, the adhesive layer 132 may be cured using, for example, UV light.

Figure 3:
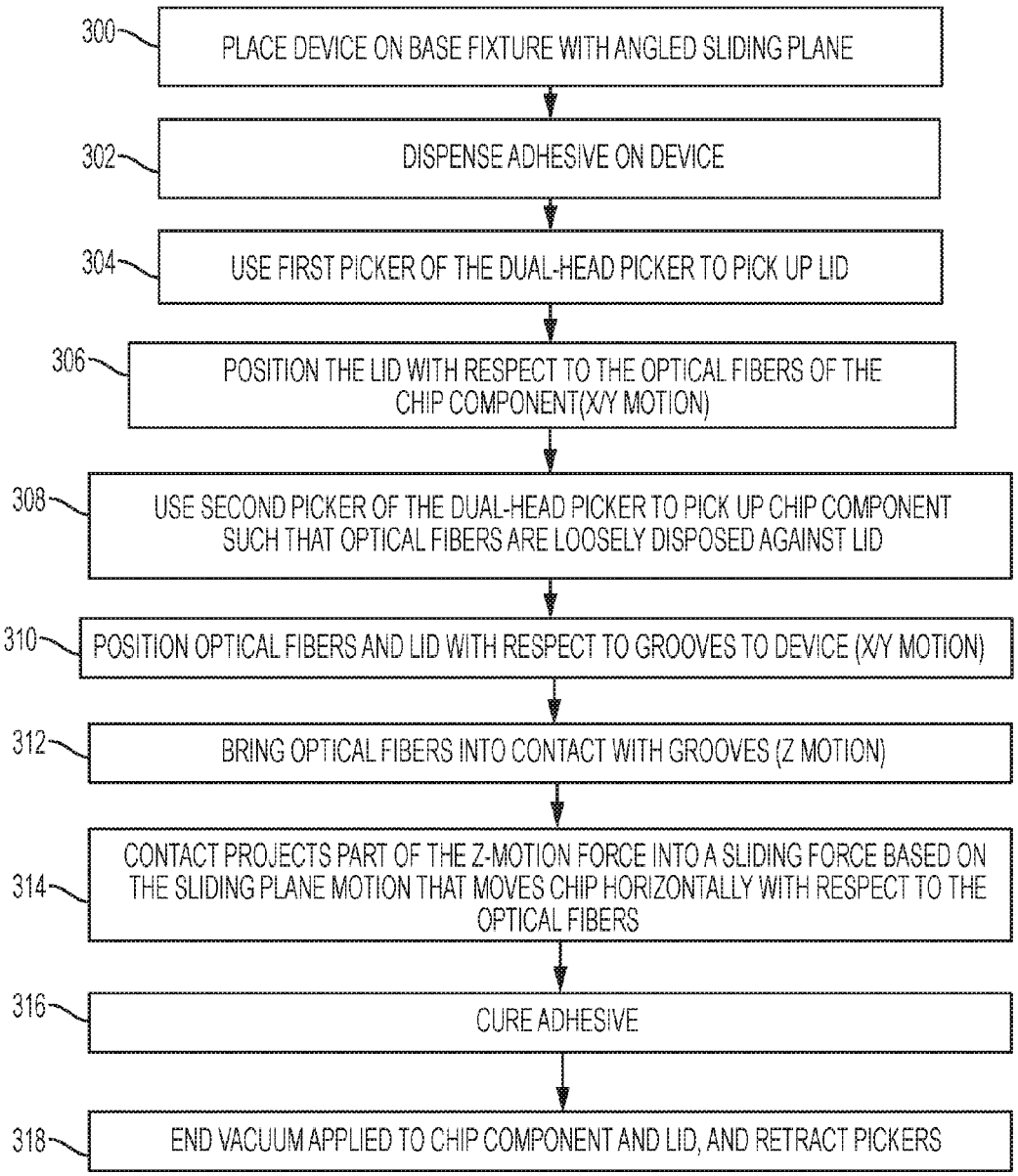
FIG. 3 is a flow diagram illustrating a method of assembling a fiber component to a chip according to a non-limiting embodiment.

With reference to FIG. 3, a flow diagram illustrates a method of assembling a fiber component to a chip according to a non-limiting embodiment. The method may include placing a bottom component on a base fixture with an angled sliding plane at a 0.1 to 89.9 degree angle to Z-axis motion at operation 300 or approximately 10 degree angle to approximately 30 degree angle. At operation 302, an adhesive may be optionally deposited on the chip. At operation 304, a first picker picks up and supports a fiber lid using, for example, a vacuum force. At operation 306, the first picker aligns the lid with respect to optical fibers included with a fiber component. At operation 308, a second picker picks up and supports the fiber component independently from the fiber lid. Accordingly, the optical fibers are loosely disposed against the exposed surface of the fiber lid. At operation 310, the dual-headed picker mechanism is adjusted in the X and/or Y axes so as to align the lid and the optical fibers with respect to the groove (e.g., V-grooves) formed in the chip. At operation 312, the lid and optical fibers are brought into contact with the chip and grooves, respectively, through Z-axis motion. At operation 314, one or more optical fibers slide along the surface of the grooves in the X-axis direction so as to butt coupled one or more optical fibers with a respective waveguide coupler. At operation 316, the adhesive is cured using, for example, UV light so as to fixate the lid and optical fibers to the chip. Finally, the vacuum forces applied to the fiber component and lid are removed at operation 318 and the dual-head picker mechanism is retracted leaving behind the assembled photonic component.

Figure 4A:
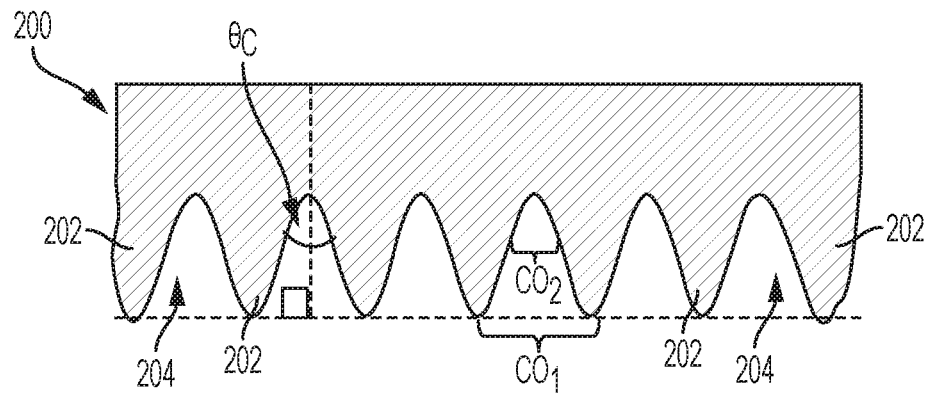
FIGS. 4A-4B illustrate a comb configured to pre-align optical fibers included in a fiber component according to a non-limiting embodiment.
Figure 4B:
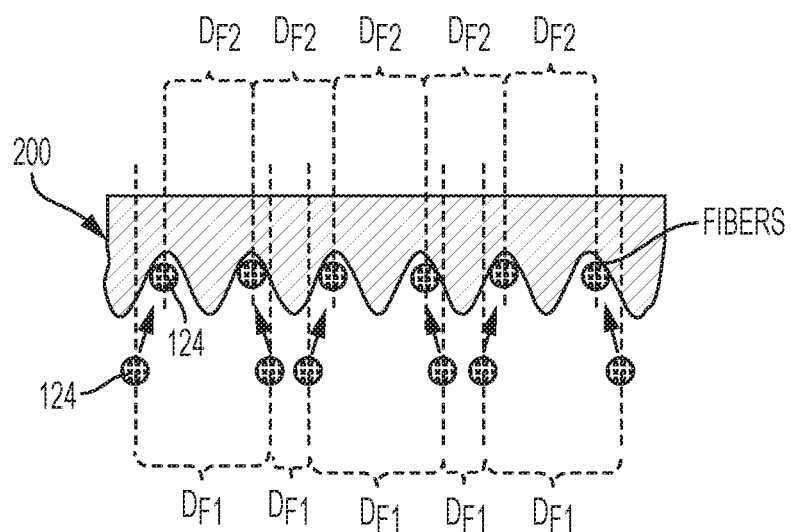

Referring to FIGS. 4A-4B, at least one embodiment provides a comb 200 configured to pre-align the optical fibers 124. The comb 200 may be installed on the assembly stage 102 and/or one or more of the pickers 104a-104b as discussed in greater detail below. The comb 200 has a plurality of teeth 202 that define individual cavities 204 therebetween. The cavities are defined by extending into the comb 200 at a cavity angle ($\theta_C$) so as to define a first cavity opening ($C_{O1}$) which gradually decreases to a second groove opening ($C_{O2}$). In at least one embodiment, the first cavity opening of the comb 200 is larger than the first groove opening of the chip. In addition, a cavity width defined by cavity at any vertical distance from the first comb opening is larger than a width of the chip groove at any vertical distance from the first groove opening.

According to a non-limiting embodiment, the cavities 204 of the comb 200 are have a larger re-alignment range than the V-grooves 108. In this manner, the point where optical fibers 124 interface with both cavities 204 and V-grooves 108 to have more liberty of movement in the cavities 204 than in V-grooves 108. Accordingly, the cavities 204 perform a pre-alignment of the fibers to within the re-alignment range of the V-grooves on chip, which is typically between 10 and 75 um. In at least one embodiment, the cavities 204 have a larger top opening than the V-grooves 108. To prevent over-constraining the system, the cavities 204 need to be designed as for the fiber to be able to move within the cavities 204 by at least the tolerances involved in manufacturing of the cavities 204 and V-grooves 108, as well as the tolerances in positioning cavities 204 versus V-grooves 108. These tolerances may range from about 1 μm to 75 μm or may range from about 10 μm to about 30 μm.

In at least one embodiment, the shape of the cavities 204 of comb 200 is chosen to be closer to a U-groove than a V-groove to allow the required fiber freedom of movement. In another embodiment, the cavities 204 show a V-groove shape but extend into the comb 200 at a second angle ($\theta_C$) greater than the first angle ($\theta_G$) of the V-grooves 108. In another embodiment, the cavities 204 show a V-groove shape and extend into the comb 200 at a mostly equal angle ($\theta_C$) to the first angle ($\theta_G$) of the V-grooves 108 but their much larger top opening is sufficient for the required fiber liberty of movement preventing over-constraining the fibers.

Referring further to FIGS. 4A-4B, the cavities 204 are configured to isolate each optical fiber 124 from one another and pre-align the optical fibers 124 so as to adjust the fiber pitch ($D_F$) to substantially match or more closely match the groove pitch ($D_G$) of the chip. For example, prior to contacting the comb 200, the optical fibers 124 are loosely arranged so as to define a first fiber pitch (DF1). Since the second ends (e.g., fiber tips) of the optical fibers are loosely disposed against the lid 122, the first fiber pitch (DF1) may be a non-uniform pitch (DF1). In response to contacting the comb 200, each optical fiber 124 is directed into a respective cavity 204 so as to isolate each optical fiber 124 from one another. In addition, the first fiber pitch (DO is changed to a second fiber pitch ($D_{F2}$) and brought into line to match, or substantially match, the groove pitch ($D_G$) defined by the grooves 108 formed in the chip 102. In addition, the uniformity of the second fiber pitch ($D_{F2}$) is improved with respect to the initial first fiber pitch ($D_{F1}$). In at least one embodiment, the second fiber pitch ($D_{F2}$) is made substantially uniform due to the uniform pitch of the V-grooves 108 as further illustrated in FIG. 4B.

Figure 5A:
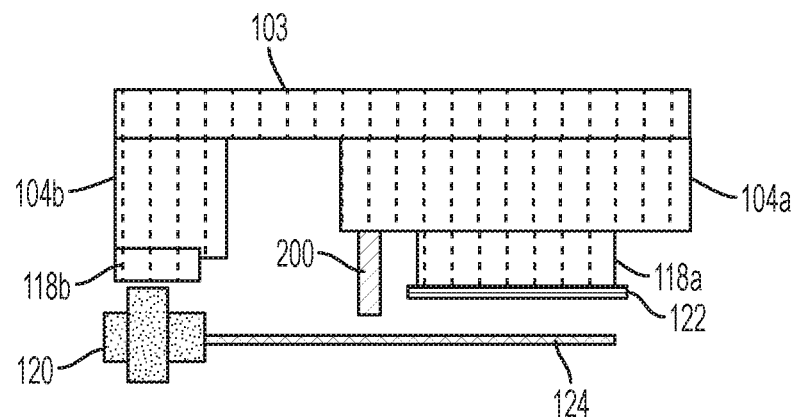
FIGS. 5A-5B illustrate the comb of FIGS. 4A-4B installed on a picker included in a component and chip assembly apparatus according to a non-limiting embodiment.
Figure 5B:
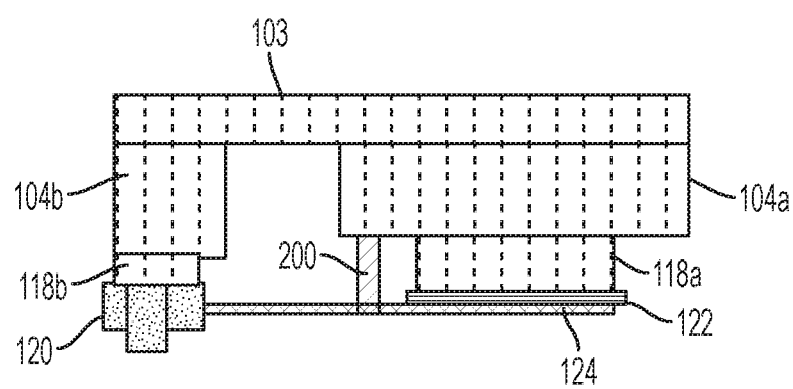

Referring now to FIGS. 5A-5B, a dual-head picker 103 is illustrated including a comb 200 installed on the first picker 104a. In at least one embodiment illustrated in FIG. 5A, the comb 200 is installed between the first end face 118a of the first picker 104 and the second end face 118b of the second picker 104b. In this manner, when the second picker 104b picks up the fiber component 120 after picking up the fiber lid 122 (see FIG. 5B), the optical fibers 124 are forced in respective cavities of the comb 200 such that an initial first fiber pitch ($D_{F1}$) is adjusted into a second fiber pitch ($D_{F2}$). Accordingly, a pre-alignment of the optical fibers is achieved upstream from a location where the optical fibers 124 are disposed in the grooves 108.

Figure 6A:
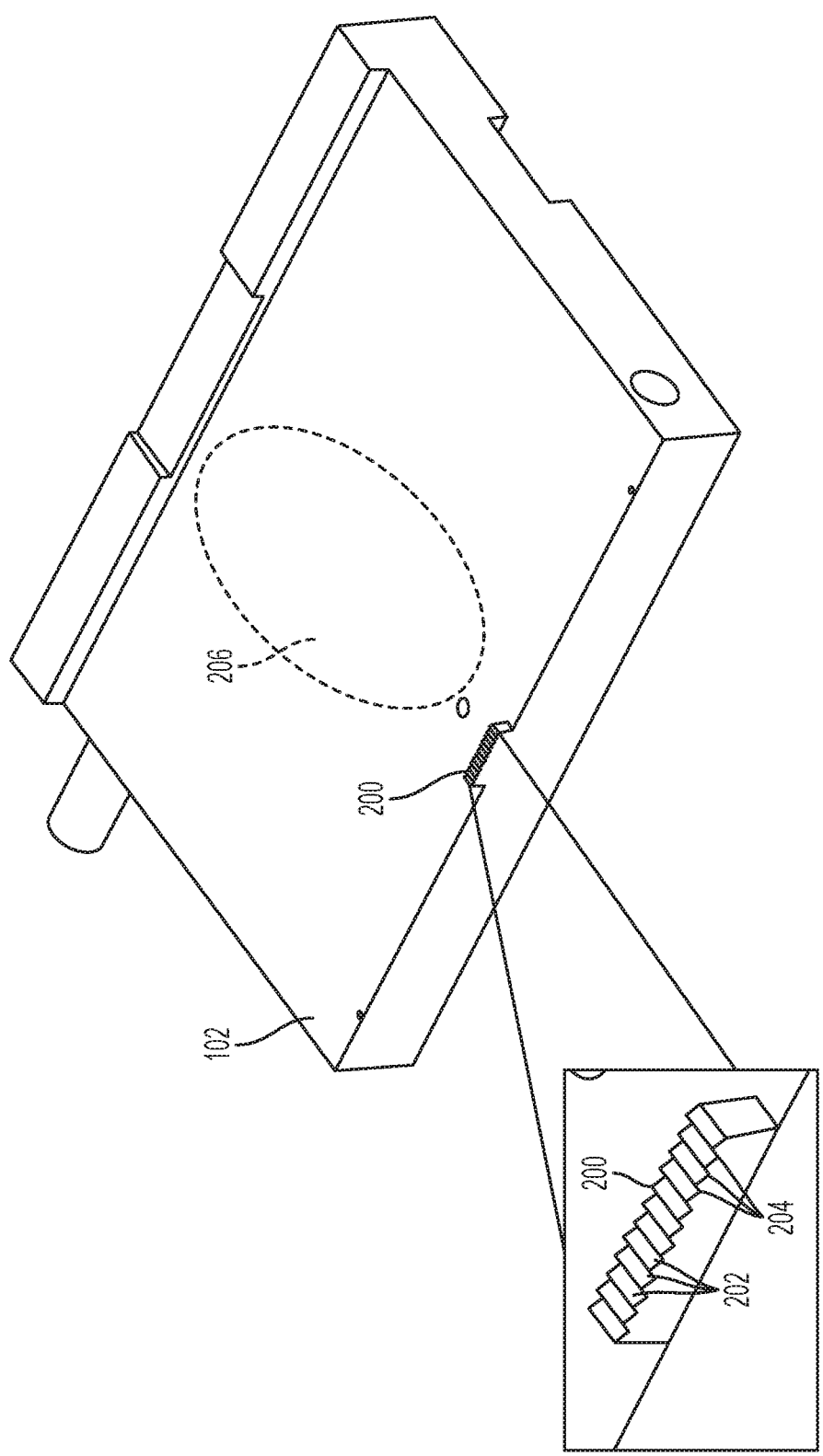
FIGS. 6A-6C illustrate the comb of FIGS. 4A-4B installed on an assembly stage included in a component and chip assembly apparatus according to a non-limiting embodiment.
Figure 6B:
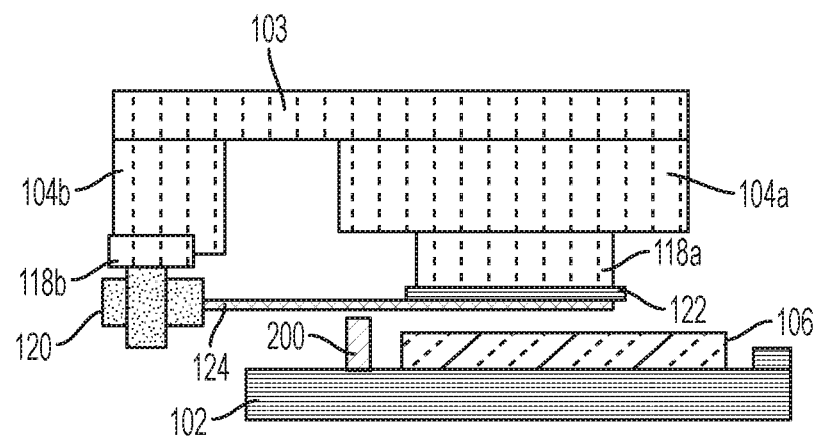
Figure 6C:
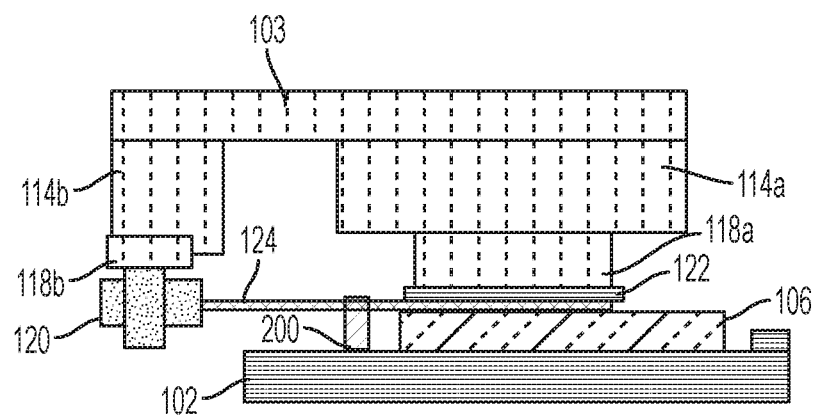

Turning now to FIGS. 6A-6C, a dual-head picker 103 is illustrated including a comb 200 installed on assembly stage 102. In at least one embodiment, the comb 200 is installed on the assembly stage 102 separate from the chip 106, and upstream from the support area 206 configured to support a chip 106 as further illustrated in FIG. 6A. During operation, the optical fibers 124 are first loosely disposed against the exposed surface of the fiber lid 122 (see FIG. 5A) as described in detail above. Thereafter, the dual-head picker mechanism 103 is moved in the Z-axis direction such that the optical fibers 124 are brought into contact with the comb 200. Since the comb 200 may be interposed between the chip 106, and the loose ends of the optical fibers 124 and/or the lid 122, pre-alignment of the optical fibers 124 is achieved upstream from the grooves formed in chip 106.

Figure 7A:
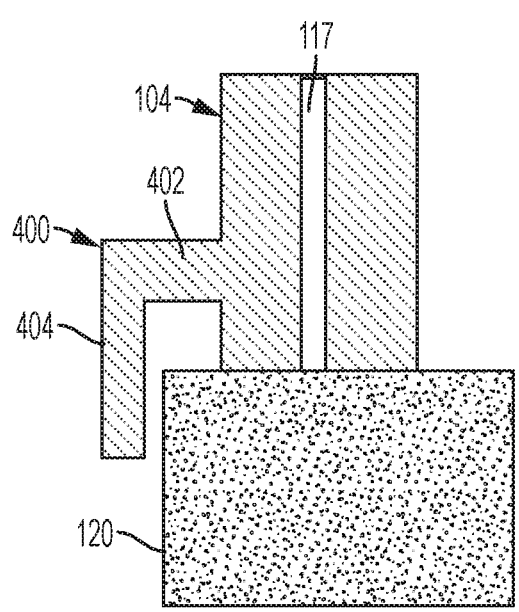
FIGS. 7A-7B illustrate a lip support installed on at least one picker of a component and chip assembly apparatus according to a non-limiting embodiment.
Figure 7B:
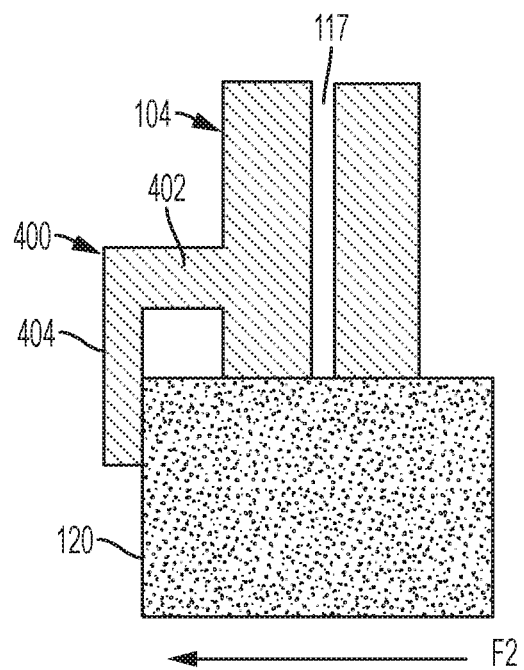

Turning now to FIGS. 7A-7B, a component and chip assembly apparatus 100 including at least one picker having a lip support 400 installed thereon is illustrated according to a non-limiting embodiment. In a case where component and chip assembly apparatus 100 includes a dual-head picker described above, the lip support 400 may be installed on the second picker (previously indicated as numeral 114b) so as to inhibit sliding of the fiber component 120 in the X-axis direction. The lip support 400 includes a base 402 extending in a first direction (e.g., X-axis) from a first side of the picker 104, and a stopper 404 extending from the base 402 in a second direction (e.g., Z-axis) perpendicular from the first direction. In this manner, the stopper 404 is configured to inhibit the fiber component 120 from moving beyond the lip support 400 when butt coupling the optical fibers with the waveguide couplers as illustrated in FIG. 7B. If slippage occurs when sliding the optical fibers 124, the lip support 400 assists in ensuring that the optical fibers 124 continue the butt coupling process. Inhibiting the movement of the fiber component 120 may ensure that the optical fibers 124 move along the V-grooves 108 until one or more loose ends butt up against the waveguide couplers 110 included in the chip 106.

Figure 8A:
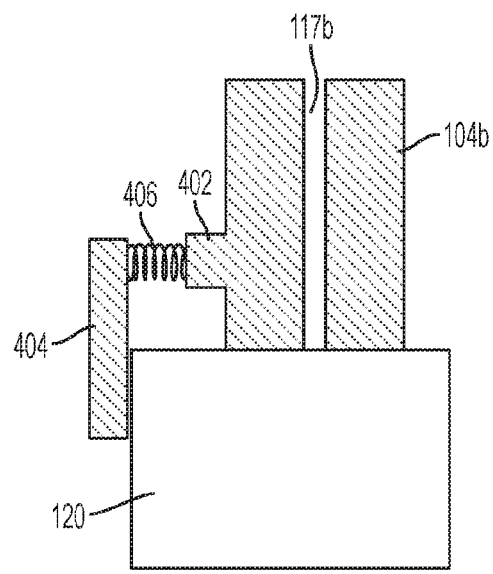
FIGS. 8A-8C illustrate a lip support including an elastic member configured to apply a bias force against a fiber component according to various non-limiting embodiments.
Figure 8C:
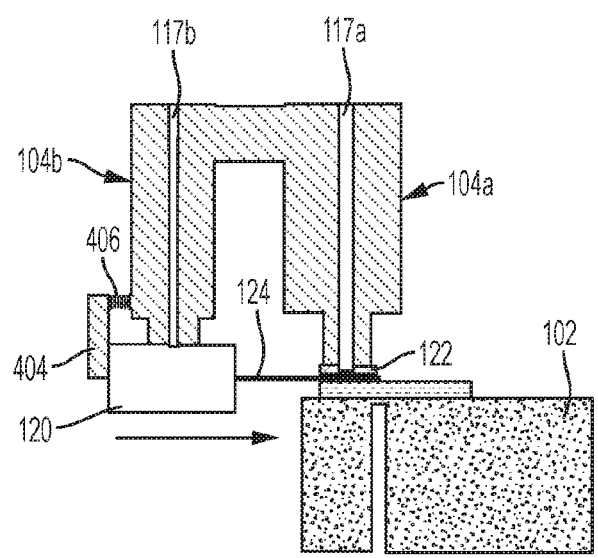
Figure 8B:
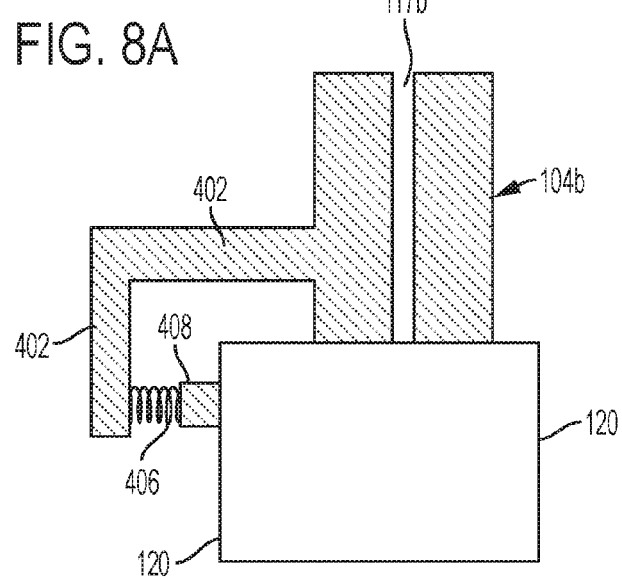

Referring to FIGS. 8A-8C, various non-limiting modifications of the lip support 400 are illustrated. For example, a first modification illustrated in FIG. 8A incorporates an elastic member 406 such as, for example, a spring 406. In at least one embodiment, the elastic member 406 is interposed between the base 402 and the stopper 404. According to another non-limiting embodiment illustrated in FIG. 8B, the elastic member 406 may include a first end coupled to the stopper 404 and a second end attached to a bumper 408, which may directly contact the fiber component 120. In either configuration, the elastic member 406 is configured to apply a bias forced against the fiber component 120 as illustrated in FIG. 8C. In this manner, the elastic member 406 allows for controlling the force applied by one or more optical fibers 124 against the waveguide couplers 110.

Figure 9A:
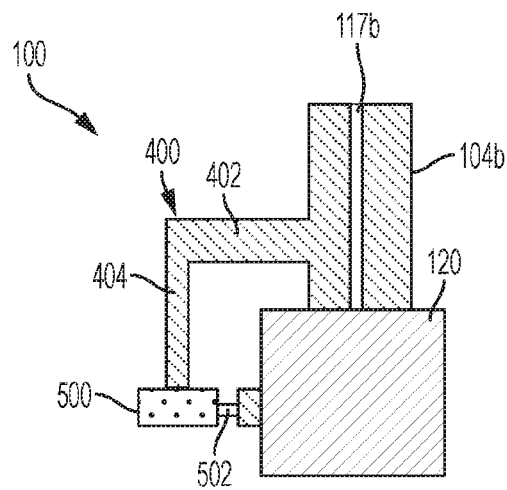
FIGS. 9A-9B illustrate a lip support including a piston-type actuator configured to apply a pushing force against a fiber component according to a non-limiting embodiment.
Figure 9B:
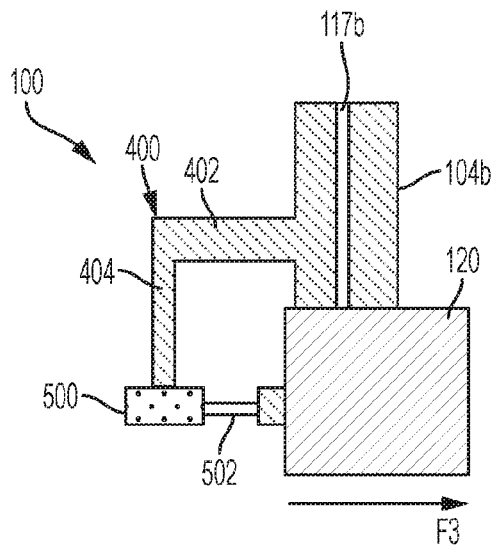

Turning now to FIGS. 9A-9B, a component and chip assembly apparatus 100 is illustrated including at least one picker 104 having an actuator 500 installed thereon. As illustrated in FIG. 9A, the actuator 500 may be combined with the lip support 400. For example the actuator 500 is coupled to the stopper 404 so as to apply a pushing force (F3) against the fiber component 120. In at least one non-limiting embodiment, the actuator 500 includes a piston-type actuator configured to force a sliding piston 502 against the fiber component 102 (see FIG. 9B). In this manner, the actuator 500 can push the fiber component 120 so as to butt couple one or more optical fibers 124 with a respective waveguide coupler. Accordingly, at least one embodiment allows for eliminating the need to use a conventional incline plane assembly stage to move the chip toward the optical fibers to facilitate the butt coupling process.

Figure 9C:
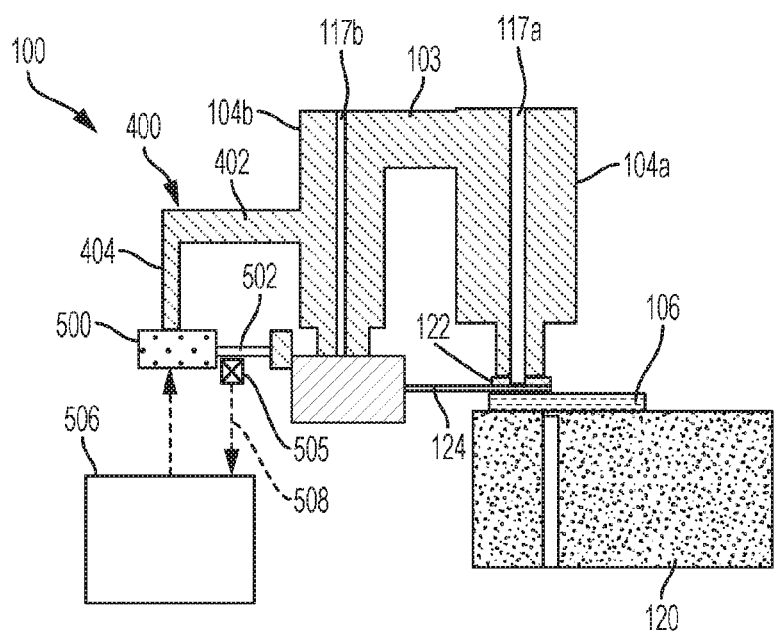
FIG. 9C illustrates a lip support including an active actuator control system according to a non-limiting embodiment.

Referring to FIG. 9C, a component and chip assembly apparatus 100 is illustrated including an active actuator control system 504 is illustrated according to a non-limiting embodiment. The active actuator control system 504 includes a piston-type actuator 500, one or more sensors 505, and an electronic controller 506. The sensors 505 are installed on the actuator 500 or sliding piston 502, for example, and are in signal communication with the controller 506 and may be configured as a pressure sensor 505 capable of a detecting and monitoring a pressure force applied to a respective waveguide coupler included with the chip 106. For example, when the maximum force is reached (e.g., between the piston and the fiber component due to the fiber ends butting against the waveguide couplers), a feedback signal is delivered to the controller 506. In response to receiving the feedback signal, the controller 506 commands the actuator 500 to stop pushing the fiber component.

Figure 10:
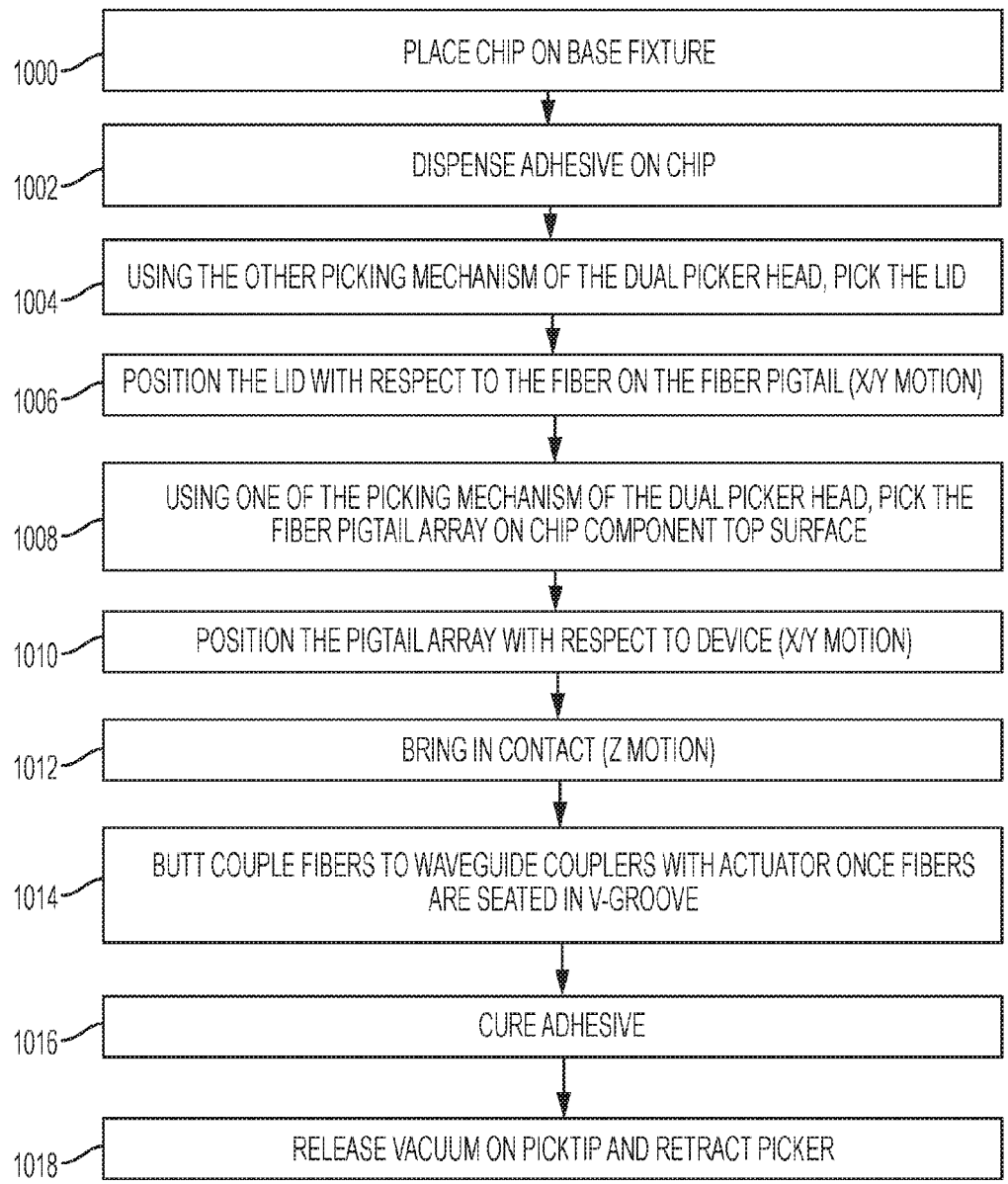
FIG. 10 is a flow diagram illustrating a method of assembling a fiber component and chip using actuator-lip support embodiment described in FIGS. 9A-9C.

Turning now to FIG. 10, a flow diagram illustrates a method of assembling a fiber component to a chip via an actuator according to a non-limiting embodiment. The method begins at operation 1000 and a chip is disposed on an assembly stage. At operation 1002, an adhesive may be optionally deposited on the chip. At operation 1004, a first picker picks up and supports a fiber lid using, for example, a vacuum force. At operation 1006, the first picker aligns the lid with respect to optical fibers included with a fiber component. At operation 1008, a second picker picks up and supports the fiber component independently from the fiber lid. Accordingly, the optical fibers are loosely disposed against the exposed surface of the fiber lid.

Turning to operation 1010, the dual-headed picker mechanism is adjusted in the X and/or Y axes so as to align the lid and the optical fibers with respect to the groove (e.g., V-grooves) formed in the chip. At operation 1012, the lid and optical fibers are brought into contact with the chip and grooves, respectively, through Z-axis motion. At operation 1014, the actuator pushes the one or more optical fibers slide along the surface of the grooves in the X-axis direction so as to butt coupled one or more optical fibers with a respective waveguide coupler. In at least one embodiment, the actuator is formed as an active actuator that slides a piston along the X-axis in response to energizing the actuator via an electronic controller. In at least one embodiment, a sensor 505 outputs a pressure feedback signal indicating the pressure (e.g., horizontal forced) applied by one or more optical fibers against a respective waveguide coupler. When the measured pressure exceeds a pressure threshold, the controller de-energizes the actuator and stops the horizontal sliding movement of the optical fibers. At operation 1016, the adhesive is cured using, for example, UV light so as to fixate the lid and optical fibers to the chip. Finally, the vacuum forces applied to the fiber component and lid are removed at operation 1018 and the dual-head picker mechanism is retracted leaving behind the assembled photonic component.

The controller 506 is in signal communication with each of the pressure sensor 505 and the active actuator 500. In this manner, the controller 506 is configured to energize the active actuator 500, which in turn moves the piston 502 in the horizontal direction (e.g., along the X-axis). The piston 502 pushes the fiber component 120 until a loose end of one or more optical fibers abuts a respective waveguide coupler. In response to the contact, the pressure sensor 505 outputs the pressure feedback signal 508 indicative of the pressure or force applied to the waveguide coupler. The controller 506 compares the pressure value indicated by the pressure signal 508 to a pressure threshold. When the pressure value exceeds the pressure threshold, the controller 506 de-energizes the active actuator 500 so as to stop the movement of the fiber component 120 before an excessive amount of force is applied to the waveguide coupler. In this manner, damage to one or more waveguide couplers may be avoided.

Figure 11A:
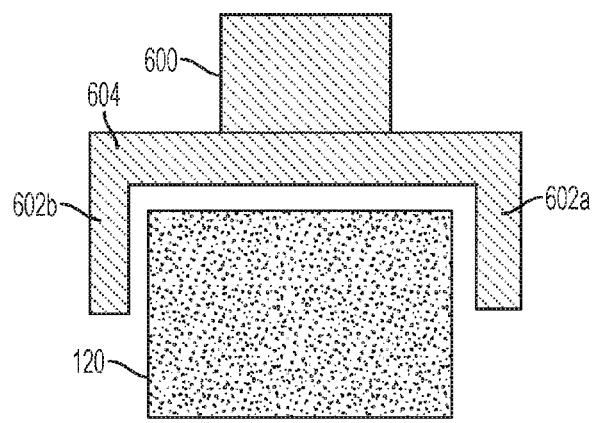
FIGS. 11A-11D illustrate a dual-picker mechanism including a gripper mechanism configured to pick and place a fiber component independently from a fiber lid according to a non-limiting embodiment.
Figure 11B:
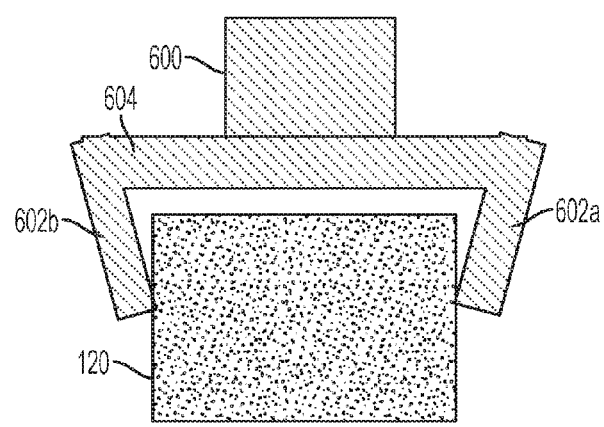
Figure 11C:
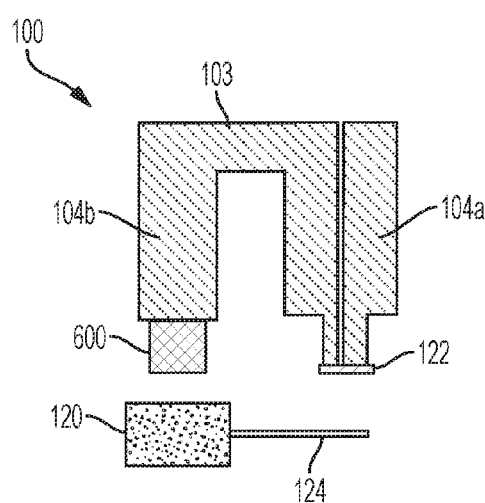
Figure 11D:
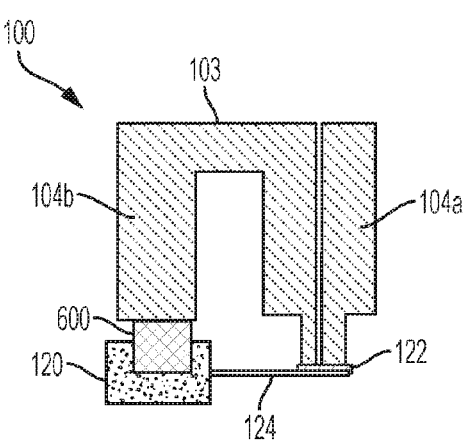

With reference now to FIGS. 11A-11D, a component and chip assembly apparatus 100 including one or more pickers 104a-104b having a gripping mechanism 600 is illustrated according to a non-limiting embodiment. Although FIGS. 11A-11D shows the gripping mechanism 600 installed on the second picker 104b, it should be appreciated that a second gripping mechanism (not shown) may also be installed on the first picker 104. In at least one embodiment, the gripping mechanism 600 includes a pair of opposing grapplers 602a-602 movable with respect to a gripper base 604. In this manner, the grapplers 602a-602b are configured to operate in an open state (see FIG. 11A) and a closed state (see FIG. 11B). Various configurations to achieve the open and closed states are envisioned including, for example, a hinge joint formed at the gripper base 604 and each grappler 602a-602b (see FIG. 11B). In another embodiment, a track (not shown) extends parallel with the gripper base 604 and allows the grapplers 602a-602b to slide toward and away from the center of the gripper base 604. Accordingly, a fiber lid 122 can be picked up and supported independently from the fiber component 120. As shown in FIG. 11C, for example, the fiber lid 122 is initially picked up and supported against the first picker 104a via a vacuum force. After picking up the fiber lid 122, the dual-head picker mechanism 103 is lower toward the fiber component 120 such that an opened gripping mechanism 600 is positioned around the fiber component 120. Thereafter, the grapplers 602a-602b are closed so to apply pressure against the sides of the fiber component 120. In this manner, the fiber component 120 is independently picked up and supported while the optical fibers 124 are loosely disposed against the exposed side of the fiber lid 122 as illustrated in FIG. 11C.

Turning now to FIGS. 12A-12G, a process flow illustrating sequential operation of a component and chip assembly apparatus 100 including a single picker 104 configured to assemble a fiber component 120 to a chip 106 is illustrated according to a non-limiting embodiment. The picker 104 first moves to pick up and support the fiber lid. Various components such as the fiber lid 122, for example, may picked up and supported using, for example, a vacuum force delivered via a vacuum pathway 117 (see FIG. 12A). After picking up the fiber lid 122, the picker 104 is maneuvered to place the fiber lid 122 on an upper surface of the assembly stage 102 (see FIG. 12B). Once the fiber lid 122 is delivered to the assembly stage 102, the picker 104 moves to pick up and support the fiber component 120 (See FIG. 12C). Subsequent to obtaining the fiber component 120, the picker 104 is maneuvered to place the fiber component 120 on a lower surface of the assembly stage 102 (see FIG. 12D). In this manner, the optical fibers 124 are loosely disposed against an exposed surface of the fiber lid 122.

After arranging the optical fibers 124 against the fiber lid 122, the picker 104 moves to pick up and support the chip 106 (see FIG. 12E). In at least one embodiment, an adhesive layer 132 is pre-deposited on a lower surface of the chip 106 as further illustrated in FIG. 12E. The picker 104 is then maneuvered such that the chip 106 is brought into contact with the exposed surface of the fiber lid 122 such that the optical fibers 124 are disposed within the grooves (e.g., V-grooves) formed in the chip 106 (see FIG. 12F). Thus, the chip 106 is the final component placed on the assembly stage 102 such that the grooves of the chip 106 are brought into contact with the optical fibers 124 after the fiber component 120 is placed on the assembly stage 102. This sequence allows the optical fibers 124 to be loosely disposed against the fiber lid 122 (i.e., not fixed to the lid with adhesive) and reduces resistance of the optical fibers 124 when being disposed into the grooves so as to improve the alignment of the optical fibers 124 with respect to the grooves. In at least one embodiment, the assembly stage 102 is formed of a transparent material, and is installed with a UV energy source 150. Accordingly, UV light may be emitted from the energy source 150 and through the assembly stage 102 to cure the adhesive layer so as to fixate the fiber lid 122 and optical fibers 124 to the chip 106 (see FIG. 12F). In at least one embodiment, a lip support 400 may be incorporated with the single picker 104 as described above. In this case, the lip support 400 may inhibit the chip 106 from slide beyond the lip support 400 when the picker 104 moves horizontally to butt couple the optical fibers 124 to a respective waveguide coupler formed in the chip 106 (see FIG. 12G).

Various means may be used to facilitate the horizontal movement necessary to perform the butt coupling. In one example, a piston-type actuator (see FIGS. 9A-9B) may be coupled to the picker 104. As described above, the piston-type actuator is configured to move a piston in the X-axis direction, which in turn may push the chip toward the optical fibers so as to bring into contact one or more optical fibers and a respective waveguide coupler.

According to another embodiment illustrated in FIGS. 12H-12I, the assembly stage 102 may be equipped with a sliding plane mechanism 152. In at least one embodiment, the sliding plane mechanism 152 is movably disposed on an angled base fixture 154, while the fiber component 120 is retained in place via the force (F2) applied by the picker 104. The angled base fixture 154 is angled with respect to the sliding plane mechanism 152 at an angle ranging, for example, from approximately 0.1 degreess to 89.9 degree angle to Z-axis motion. By retaining the fiber component 120 in place, the chip 106 is allowed to slide along the X-axis direction with respect to the fiber component 120. In this manner, the optical fibers of the fiber component 120 and the waveguide couplers of the chip 106 may be brought into contact by sliding the sliding plane mechanism 152 down the angled base fixture 154 until butt coupling is achieved as further illustrated in FIG. 12I. Although the sliding plane mechanism 152 and angled base fixture 154 are illustrated according to a non-limiting embodiment shown in FIGS. 12H-12I, it should be appreciated that the sliding plane mechanism 152 and angled base fixture 154 may also be implemented in any of the non-limiting embodiments described in detail above with respect to FIGS. 1A-11C.

Figure 13:
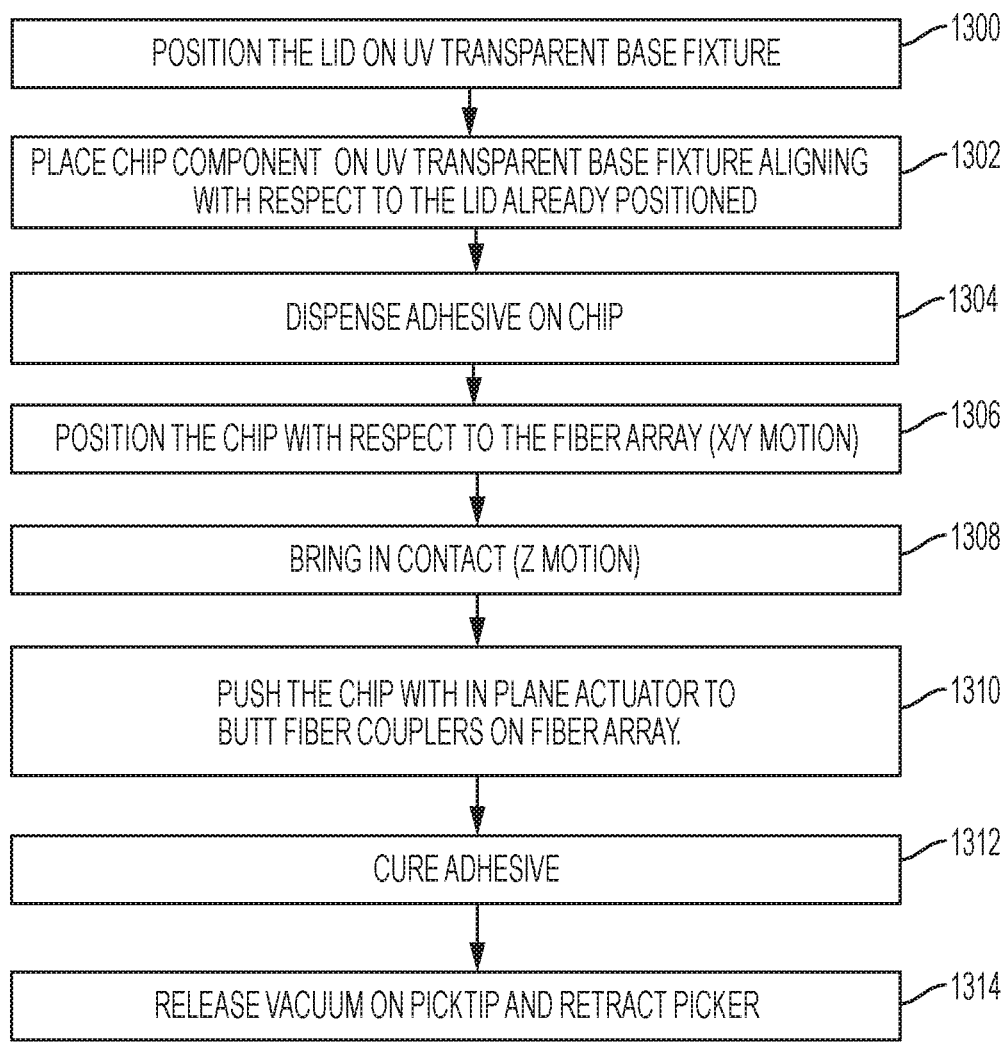
FIG. 13 is a flow diagram illustrating a method of assembly a fiber component with a chip using a sequenced single picker according to a non-limiting embodiment.

Referring to FIG. 13, a flow diagram illustrates a method of assembling a fiber component to a chip via an actuator according to a non-limiting embodiment. The method begins at operation 1300, and a fiber lid is picked up and placed on an assembly stage. In at least one embodiment, the assembly stage is formed of a UV transparent material capable of allowing UV light to pass therethrough. At operation 1302, a fiber component such as a ferrule, for example, is picked up and placed on the assembly stage such that the optical fibers are loosely disposed on an exposed surface of the fiber lid. At operation 1304, an adhesive is dispensed on a first surface of the chip. At operation 1306, the picker is maneuvered in the X-axis and/or Y-axis directions so as to position the chip with respect to the optical fibers. At operation 1308, the picker is moved in the Z-axis direction such that the chip is brought into contact with the optical fibers. In this manner, loose optical fibers are aligned within grooves formed in the chip. At operation 1310, the chip is pushed along the X-axis direction such that one or more optical fibers are butt coupled with a respective waveguide coupler formed in the chip. At operation 1312, the adhesive is cured. In at least one embodiment, a UV light is output from a UV light source. The UV light travels through the UV transparent assembly stage where it reacts with the adhesive causing the adhesive to cure. At operation 1314, picker mechanism is retracted leaving behind the assembled photonic component.

Figure 14:
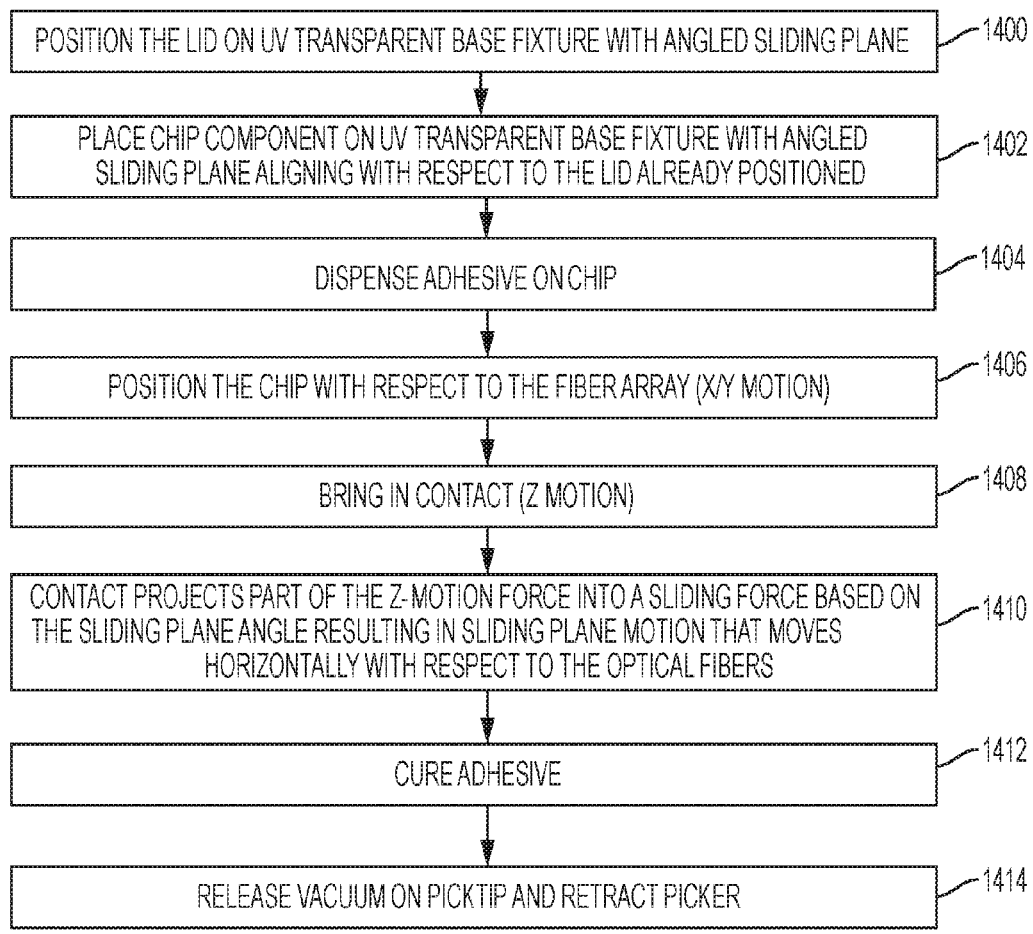
FIG. 14 is a flow diagram illustrating a method of assembly a fiber component with a chip using a sequenced single picker and an assembly stage including a sliding plane mechanism and angled base fixture according to a non-limiting embodiment.

Referring now FIG. 14, a flow diagram illustrates a method of assembling a fiber component to a chip via a sliding assembly stage according to a non-limiting embodiment. The method begins at operation 1400, and a fiber lid is picked up and placed on a sliding plane mechanism included with the assembly stage. In at least one embodiment, the assembly stage is formed of a UV transparent material capable of allowing UV light to pass therethrough. At operation 1402, a fiber component such as a ferrule, for example, is picked up and placed on the assembly stage such that the optical fibers are loosely disposed on an exposed surface of the fiber lid. At operation 1404, an adhesive is dispensed on a first surface of the chip.

At operation 1406, the picker is maneuvered in the X-axis and/or Y-axis directions so as to position the chip with respect to the optical fibers. At operation 1408, the picker is moved in the Z-axis direction such that the chip is brought into contact with the optical fibers. In this manner, loose optical fibers are aligned within grooves formed in the chip. At operation 1410, the sliding plane mechanism is slide down the angled base fixture. In this manner, the chip moves along with the sliding plane mechanism, but with respect to the fiber component such that one or more optical fibers are butt coupled with a respective waveguide coupler formed in the chip. At operation 1312, the adhesive is cured. In at least one embodiment, a UV light is output from a UV light source. The UV light travels through the UV transparent assembly stage where it reacts with the adhesive causing the adhesive to cure. At operation 1314, picker mechanism is retracted leaving behind the assembled photonic component.

As described in detail above, various non-limiting embodiments provide a component and chip assembly apparatus that improves the process of optically coupling optical fibers to light guides formed in a semiconductor chip by assembling an optical lid simultaneously, or approximately at the same time, the optical fibers are transferred onto the chip. Unlike conventional component and chip assembly processes, at least one embodiment loosely disposes the optical fibers against the surface of the fiber lid. That is, an adhesive, for example, does not fixate the optical fibers to the lid prior to bringing the optical fibers into contact with the chip grooves. In this manner, the loose ends (e.g., fiber tips) of the optical fibers are free to move into the V-grooves formed in the chip, and are forced into alignment. The ability to allow the loose ends to freely move with respect to the lid reduces the friction force when the fibers are slid down the V-groove during a butt coupling process performed to optically couple the fibers with the light guides. In addition, the cost of pre-applying the lid to the fiber component is removed The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A component and chip assembly apparatus, comprising:
an assembly stage configured to support a chip, the chip including grooves defining a first pitch, the grooves including a first groove opening configured to receive a plurality of optical fibers and to align the plurality of optical fibers; and
a picker configured to bring a fiber component including a plurality of optical fibers having a second pitch into contact with the chip such that each optical fiber is aligned with a respective groove,
wherein at least one of the assembly stage and the picker includes a comb having a plurality of teeth that define individual cavities therebetween, the cavities having a first cavity opening to receive the optical fibers and isolate each optical fiber from one another and pre-align the optical fibers so as to adjust the second pitch to substantially match the first pitch, and
wherein the first cavity opening is larger than the first groove opening, and a cavity width of each of the individual cavities at any vertical distance from the first comb opening is larger than a width of an opposing chip groove at any vertical distance from the first groove opening.

2. The apparatus of claim 1, wherein the grooves extend into the chip at a first angle and the cavities extend into the comb at a second angle greater than the first angle.

3. The apparatus of claim 2, wherein the comb is installed on the picker and adjusts the pitch of the optical fibers prior to bringing the plurality of optical fibers into contact with the chip.

4. The apparatus of claim 2, wherein the plurality of optical fibers each include a first end fixed to the fiber component and a second end configured to fit in a respective groove, and
wherein the comb is installed on the assembly stage separate from the chip, and is interposed between the chip and the first end of the optical fibers such that pre-alignment of the optical fibers exists upstream from the chip to adjust the pitch of the fibers and bring the pitch closer to the groove pitch on chip.

5. The apparatus of claim 1, wherein the picker further comprises:
a first picker head including a first vacuum port configured to direct a first vacuum force to a first surface of an optical fiber lid so as to support the optical fiber lid directly against first picker head; and
a second picker head including a second vacuum port configured to direct a second vacuum force so as to support the fiber component directly against the second picker head such that the optical fibers are disposed directly against a second surface of the optical fiber lid opposite the first surface.

6. The apparatus of claim 1, wherein the picker further comprises:
a first picker head including a vacuum port configured to deliver a vacuum force to a first surface of an optical fiber lid so as to support the optical fiber lid directly against first picker head; and
a second picker head including a mechanical gripping mechanism configured to grasp the fiber component such that the optical fibers are disposed directly against a second surface of the optical fiber lid that is opposite the first surface.

7. The apparatus of claim 1, wherein the picker further comprises a lip support including a base extending in a first direction from a first side of the picker and a stopper extending from the base in a second direction perpendicular from the first direction, the stopper configured to inhibit the fiber component from moving beyond the lip support.

8. The apparatus of claim 7, wherein the lip support further includes an elastic member coupled to the stopper, the elastic member configured to apply a bias forced against the fiber component.

9. The apparatus of claim 7, wherein the lip support further includes an electromechanical actuator coupled to the stopper, the actuator including a piston slidably disposed within an actuator housing, the actuator being in signal communication with an electronic controller and configured to apply a bias forced against the fiber component in response to an electronic control signal output by the controller.

10. A method of disposing optical fibers of a fiber component into respective grooves formed in a chip, the method comprising:
applying a first force via a first picker head to a first surface of an optical fiber lid so as to support the optical fiber lid to the first picker head prior to supporting the fiber component;
applying a second force via a second picker head to the fiber component after supporting the optical lid, the second force supporting the fiber component to the second picker head such that the optical fibers are loosely disposed against a second surface of the optical fiber lid opposite the first surface; and
moving the first and second picker heads along a vertical direction to bring the fiber component into contact with the chip such that the optical fibers freely move in response to contacting the grooves so as to align each optical fiber with a respective groove.

11. The method of claim 10, wherein the first force is a first vacuum force that supports the first surface directly against first picker head, and the second force is a second vacuum force.

12. The method of claim 10, wherein the first force is a first vacuum force that supports the first surface directly against first picker head, and the second force is a pressing force applied to sides of the fiber component.

13. The method of claim 11, further comprising bring the fiber component into contact with a comb is installed on the picker so as to adjust the optical fiber pitch prior to bringing the plurality of optical fibers into contact with the chip.

14. The method of claim 10, further comprising sliding the optical fibers along the grooves in a horizontal direction opposite the vertical direction while inhibiting the fiber component from moving in a direction opposite the horizontal direction using a lip support.

15. The method of claim 14, further comprising applying, via the lip support, a bias force in the horizontal direction to the fiber component so as to abut at least one optical fiber against a waveguide member disposed in a respective groove.

16. The method of claim 14, further comprising moving a piston installed on the lip support so as to slide the optical fibers within the grooves along the horizontal direction, and stopping the movement in response to detecting a pressing force between at least one optical fiber and a wave guide disposed in a respective groove exceeds a force threshold.

17. A method of disposing optical fibers of a fiber component into respective grooves formed in a chip, the method comprising:

performing a first component transferring process that transfers an optical fiber lid from a picker head installed on an electronic chip assembly apparatus to an assembling stage;

after performing the first component transferring process, performing a second transferring process that transfers a fiber component from the picker head to the assembling stage such that a plurality of optical fibers included with the fiber component are loosely disposed against an exposed surface of the lid;

after performing the second component transferring process, performing a third transferring process that transfers a chip from the picker head to the assembling stage such that grooves formed in the chip are aligned with the optical fibers and receive the optical fibers therein.

18. The method of claim 17, wherein the first component transferring process includes bringing the optical fibers into contact with a comb having a plurality of individual cavities that receive a respective optical fiber to perform a pre-alignment process prior to transferring the chip to the assembly stage by adjusting the fiber pitch to make the fiber pitch more similar to the chip groove pitch.

19. The method of claim 17, wherein parts of the assembly stage are formed of a transparent ultraviolet (UV) material, and a UV-reactive adhesive is applied to an exposed surface of the chip facing the exposed surface of the lid, and wherein the method further comprises:

emitting UV light through the assembly stage such that the optical lid is cured to the optical fibers via the adhesive.

20. The method of claim 17, wherein the picker head includes a lip support including a base extending in a first direction from a first side of the picker and a stopper extending from the base in a second direction perpendicular from the first direction, and wherein the third transferring process further comprises:

moving the picker head in a first horizontal direction so as to slide the optical fibers within the grooves while the stopper inhibits the fiber component from moving in a second horizontal direction opposite the first horizontal direction.

\* \* \* \* \*